Figure 1:
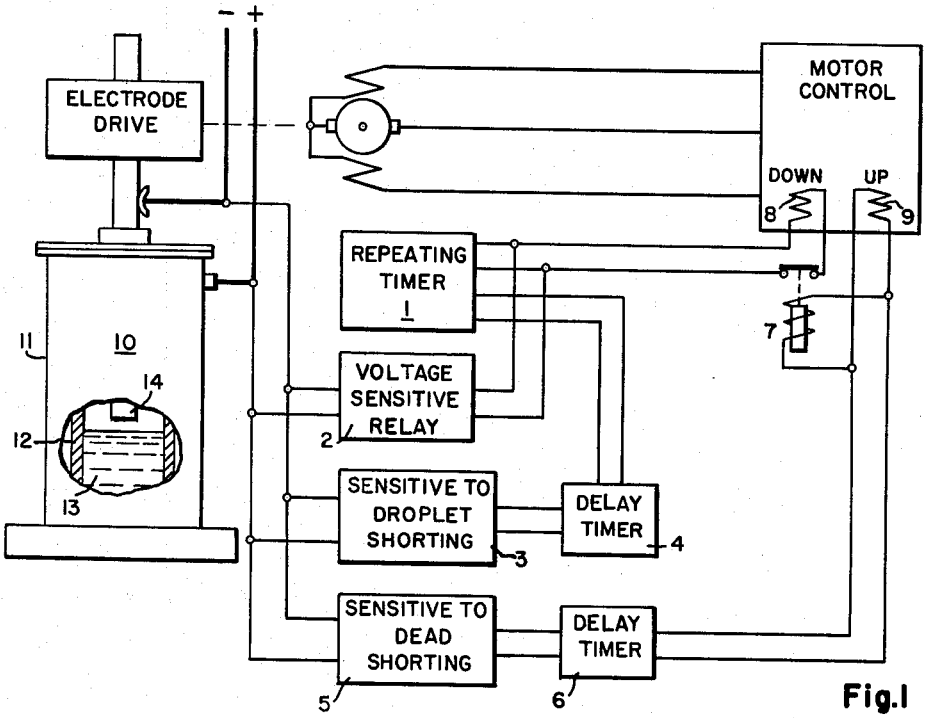

Aug. 4, 1964   R. C. BUEHL   3,143,587
ELECTRODE REGULATOR
Filed Nov. 30, 1959   2 Sheets-Sheet 1

INVENTOR.
RUSSELL C. BUEHL
By *Morris Wiseman* AGENT

United States Patent Office 3,143,587
Patented Aug. 4, 1964

3,143,587
ELECTRODE REGULATOR
Russell C. Buehl, Beaver, Pa., assignor to Crucible Steel Company of America, Pittsburgh, Pa., a corporation of New Jersey
Filed Nov. 30, 1959, Ser. No. 856,287
32 Claims. (Cl. 13—13)

This invention relates to electric arc melting furnace apparatus and particularly to electrode regulators for arc melting furnaces. More particularly, the invention is directed to an automatic regulartor for maintaining the electrode of an arc melting furnace in predetermined relationship with the surface of a metal bath and specifically to such a regulator where the furnace is of the consumable-electrode type.

Arc melting furnaces are well known and usually comprise one or more electrodes extending within a metal mold or crucible which contains a metal charge. In the case of an arc melting furnace comprising a single electrode within a mold, the electrode is connected to one terminal of a power source such as a direct-current generator, and the mold (and hence the contained metal charge) is connected to the other terminal of said power source. An arc is struck and maintained between the electrode and the metal charge, the charge forming a metal bath as a result of the heat produced by the arc and the flow of current through the metal. Where a consumable electrode is employed, droplets of metal flow from the electrode and add to the bath, the droplets forming at the hottest portion of the electrode, that is, the portion nearest the arc.

Reactive metals such as titanium and zirconium usually are melted in vacuum arc melting furnaces, the furnace containing an inert gas, such as argon, under low absolute pressure. Many present-day furnaces for melting such reactive metals employ water-cooled copper crucibles or molds and a consumable electrode of the metal to be melted, the melting being done under vacuum within the absolute pressure range of 40 microns to 20 millimeters of mercury. A short arc gap is desirable to minimize the tendency of the arc to play on the mold wall (which may cause puncturing of the mold) and to concentrate the heat of the arc in the metal bath. The arc gap usually is less than 2 inches in length, and it has been the practice to regulate the position of the electrode whereby a constant arc voltage drop of about 30 volts is maintained. Apparatus for regulating the position of the electrode which relies entirely upon the arc voltage for regulating purposes is not completely satisfactory. This is particularly true in the case of vacuum arc melting of titanium and zirconium, where there is only a small charge of arc voltage with arc gap length in the range of gap length normally used. Furthermore, the voltage drop across the arc is influenced by variables other than the length of the arc, for example, by volatile impurities in the electrode and the composition and pressure of the gaseous atmosphere. In addition, the arc voltage usually cannot be measured directly, and when the control voltage is derived from a terminal connected to the portion of the electrode extending from the furnace, the control voltage is affected by the voltage drop through the elecerode and the voltage drops through the contacts, both of which may vary during the melting process. Consequently, if the electrode is positioned to maintain a constant voltage between the electrode support and the metal bath, the length of the arc gap is not necessarily or consistently within the desired range.

If the arc shifts to the mold wall, or if the arc strikes at the mold wall, the length of the gap between the electrode and the metal bath should be reduced in order to reduce the arc voltage and to extinguish the arc to the mold wall. However, when the arc extends from the electrode to the mold wall, the voltage drop across the arc may be less than the voltage drop when the arc extends from the electrode to the bath. Under these conditions, an automatic regulator which positions the electrode to maintain a constant arc voltage drop or ratio of arc voltage to arc current will move the electrode away from the bath rather than toward the bath, this resulting in an electrode movement exactly opposite in direction to that desired.

It has been found from a study of oscillograph records, made during the vacuum melting of reactive metals such as titanium and zirconium and some complex alloys such as steels in arc furnaces of the consumable-electrode type, that momentary short circuits (0.1 to 0.3 second in duration) between the electrode and the bath occur when droplets of metal are between the electrode and the bath. Further study has revealed that arc voltage variations occasioned thereby are substantially greater than those attributable to volatile impurities in the electrode, composition and pressure changes of the inert-gas atmosphere, and arc striking between the electrode and mold wall.

In my patent application Serial Number 709,828, filed January 20, 1958, now Patent No. 2,915,572, of which the present application is a continuation-in-part, it is proposed to maintain arc control by increasing the arc gap when droplet shorting occurs. While this is a desirable feature for melting some metals, it can result in localized segregation in metals which are sensitive to small changes in solidification rate caused by changes in arc gap. This is especially important for steelmelts made at low pressures, for example, below 10 microns.

A principal object of the present invention is to provide arc melting furnace apparatus capable of producing ingots substantially free of localized segregation attributable to variation in the arc gap.

Another object of the present invention is to provide an automatic regulator for maintaining the electrode of an arc melting furnace in predetermined relationship with the surface of a metal bath.

An additional object of the invention is to provide an electrode regulator for an arc melting furnace which will maintain a uniform arc gap independent of volatile impurities in the electrode, composition and pressure changes of the gaseous atmosphere, and arc striking between the electrode and mold wall.

It is another object of the invention to provide a control for arc melting furnaces of the consumable-electrode type which stops the travel of the electrode toward the bath when droplet shorting occurs.

Still another object of the invention is to provide a control for arc melting furnaces of the consumable-electrode type which decreases the rate of travel of the electrode toward the bath when droplet shorting occurs.

Figure 3:
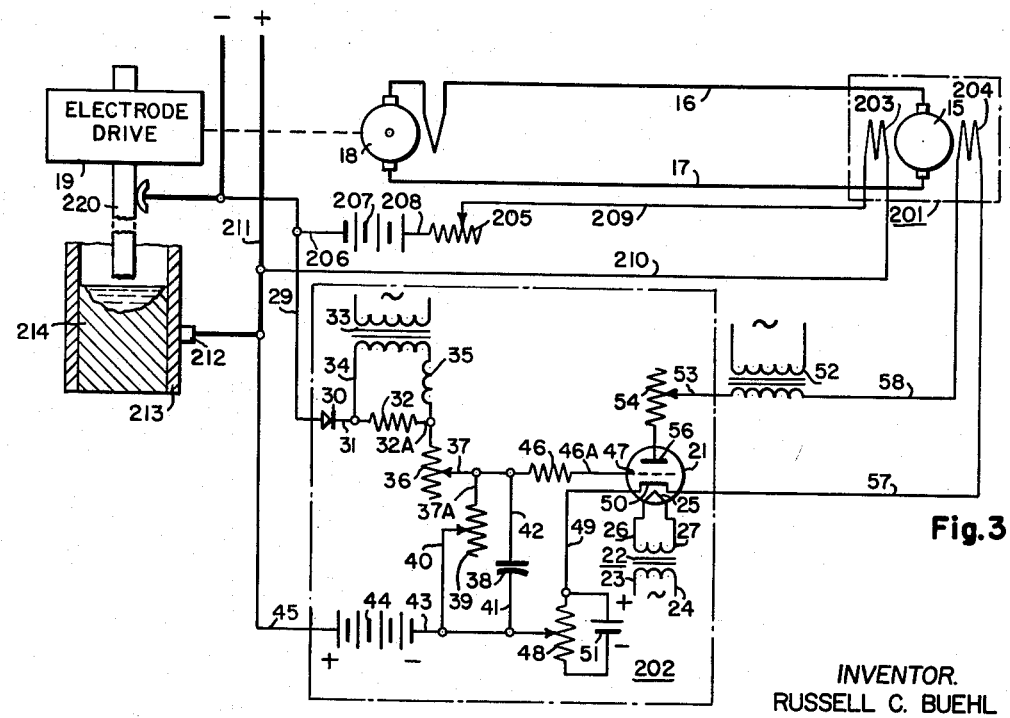
Figure 2:
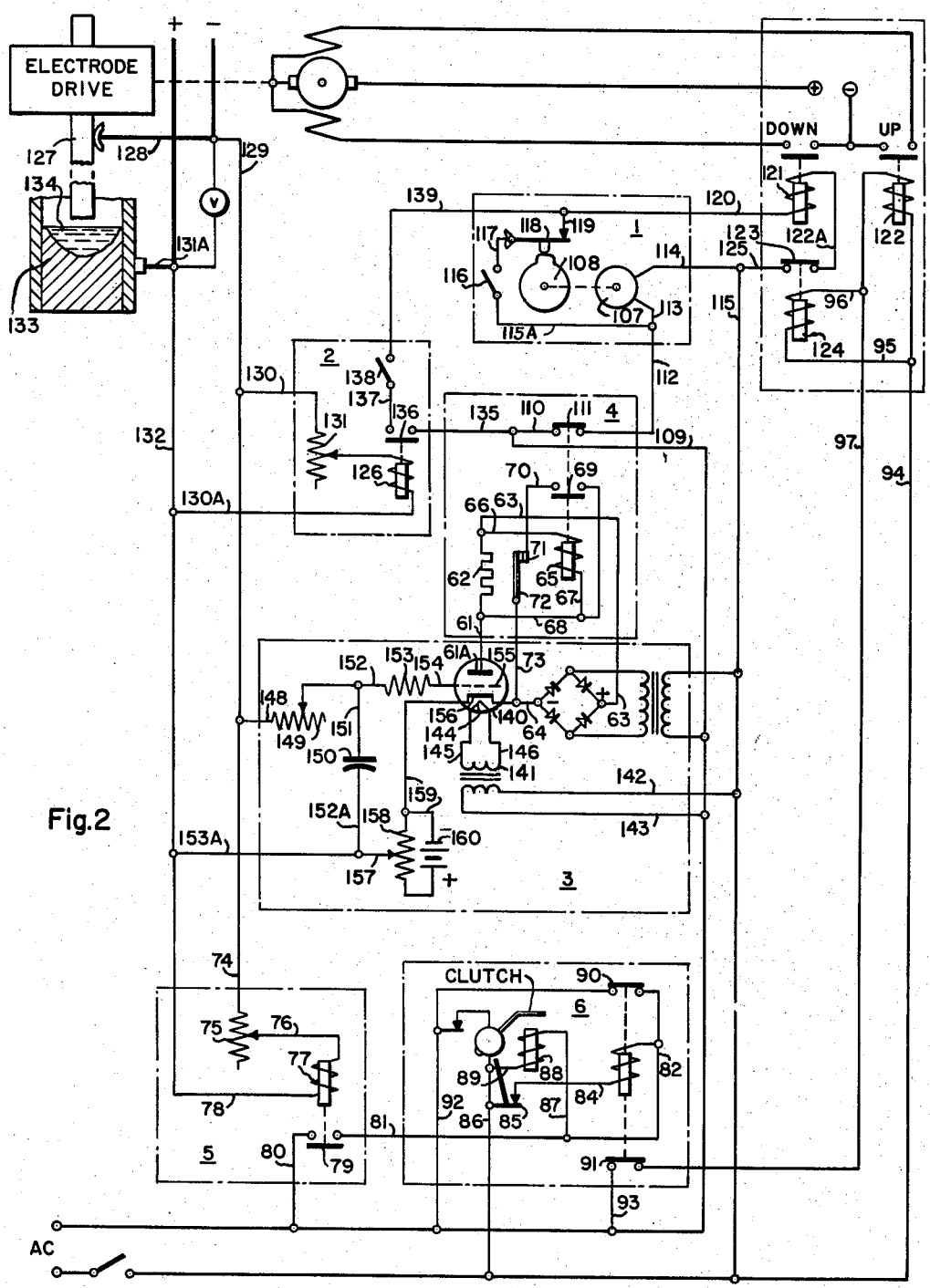

Other objects and advantages will be apparent from the following description of the invention, including specific embodiments thereof, which description should be considered in conjunction with the accompanying drawings in which:

FIG. 1 is a combined block and electrical circuit diagram of one embodiment of the invention, FIG. 2 is an electrical circuit diagram of one embodiment of regulating apparatus of the invention, and FIG. 3 is an electrical circuit diagram of another embodiment of regulating apparatus of the invention.

In accordance with the present invention, arc control is maintained by interrupting the travel of the electrode toward the bath, hereinafter referred to as "down-travel," when droplets of metal melting from the electrode cause momentary short circuits. The invention provides an electrode control for maintaining a uniform arc gap, that is, an arc having a length within a predetermined range, the arc gap being independent of such normal variations in furnace conditions as volatile impurities in the electrode, composition and pressure changes of the inert-gas atmosphere, and arc striking between the electrode and mold wall. The invention also provides a control for vacuum arc melting from consumable electrodes that maintains a suitable arc gap without depending on a precise relation of arc voltage to arc gap being maintained by the melting conditions. The present invention results in a more uniform arc gap than that described in the parent application and is responsible for a total elimination of segregation attributable to such variation.

One embodiment of the invention comprises stopping the down-travel of the electrode for a predetermined time period such that sufficient metal will melt from the electrode so that momentary shorts by droplets do not occur at the end of the period.

Another embodiment of the invention comprises decreasing the rate of down-travel of the electrode by the employment of proportional controllers. Such controllers may be in the form of magnetic amplifiers or grid-controlled rectifiers, and while more expensive than contactors employed in the embodiment of the invention wherein the down-travel of the electrode is stopped, such controllers usually have a greater degree of reliability and stability.

In general, the electrode control of the present invention consists of four elements: (1) A means for lowering the electrode at a controlled slow speed (this can be a variable-speed D.-C. motor or an A.-C. motor operating intermittently through a timer); (2) a means for increasing the rate of down-travel of the electrode if the voltage exceeds a preset value; (3) a means for stopping or decreasing the rate of down-travel when short-circuiting of the electrode occurs by droplets of metal. A preferred means of accomplishing this is by use of a grid-controlled inert-gas-filled tube for which the grid is connected to the electrode through a suitable resistor and bias, and for which the plate current interrupts the downward electrode movement; and (4) a means for raising the electrode should a complete short-circuit occur for an appreciable length of time, a voltage-sensitive relay being suitable for this purpose.

Although the regulating apparatus of the invention may be employed with other types of electric arc furnaces, FIG. 1 illustrates the regulating of the apparatus of the invention in association with a conventional arc melting furnace used for melting reactive metals, e.g., a cold-mold furnace. The furnace 10 comprises a gas-tight housing 11 which encloses a conductive mold 12 which may, for example, be made of copper. The mold 12 contains the metal 13 which is to be melted, the upper surface of the metal 13 being adjacent to the bottom end of an electrode 14. Although only one electrode 14 has been illustrated in FIG. 1, it will be apparent that a greater number of electrodes may be employed.

The electrode 14 extends outwardly from the housing 11, and its upper end is engaged by an electrode drive, which may be of any conventional type. The drive is operable by a reversible motor which is controlled by a motor control of any well known type having "up" and "down" contactor-operating relay coils.

Gases may be exhausted from and admitted to the housing 11 so that the metal 13 may be melted in a low-pressure, inert atmosphere within the mold 12. The electrode 14 is connected to an electrical power source; the housing 11, which is conductive and which is conductively connected to the mold 12, is connected to the other terminal of the power source.

The timer 1, which may be a cam-operated contact driven by a synchronous motor, provides for controlled periodic downward movement of the electrode. It would normally be set so the average speed of down-travel exceeded the rate of burn-off of the electrode. This timer could also provide for a periodic down-travel of sufficient magnitude to cause the electrode to contact the bath if this feature of the control was desired.

Voltage-sensitive relay 2 is connected across the arc between electrode 14 and metal 13 and functions to move the electrode down when the arc voltage exceeds a preset value. It is basically provided as a safety device to prevent excessive arc length by feeding the electrode down if timer 1 fails to function or if the speed of down-travel established by timer 1 is set at less than the rate of burn-off. However, voltage-sensitive relay 2 can also be set to function as the main control of down-travel to maintain constant voltage when timer 1 is not used or when the rate of travel controlled by timer 1 is set to be less than the rate of burn-off.

Device 3 is sensitive to momentary short circuits caused by droplets of metal, melting from the electrode and bridging the gap between electrode and bath. When this device is so activated, it starts delay timer 4, which stops timer 1 for a preset time period. If this time period is of suitable length, sufficient metal will melt from the electrode that momentary shorts by droplets do not occur at the end of the period. The average speed of down-travel is therefore controlled by the momentary shorts occasioned by droplets of metal melting from the electrode.

Device 5 is sensitive to complete shorting of the electrode and also to droplet shorting which is repeated at a sufficient frequency to lower the average arc voltage appreciably. It would not, however, be sensitive to the occasional momentary short circuits which operate voltage-sensitive relay 2. This device, therefore, functions when the gap between the electrode and the bath is too short. It operates the up relay 9 through delay timer 6 and therefore moves the electrode up a preset distance. Relay 7, also operated by timer 6, prevents the down relay 8 from operating during the period the up relay 9 is energized.

If the short-circuiting function of timer 1 is not operated, voltage-sensitive relay 2 may so control the speed of descent of the electrode that extensive shorting does not occur, and device 5 only operates near the start and the end of the melt, when normal momentary shorts by droplets do not occur with sufficient regularity for device 3 to function properly. The control can, therefore, maintain a uniform non-varying arc gap as long as melting of the electrode is proceeding smoothly. The functioning of this control is not influenced by normal variations in arc voltage, since the change in voltage when momentary short circuits occur is many times greater than the normal variation in arc voltage.

In FIGURE 2, the circuits corresponding to the components of the regulating apparatus shown in FIGURE 1 have been enclosed by dotted lines labeled with the corresponding reference numeral.

Part 1 comprises a synchronous-motor-driven timer whose function is to control the rate at which the electrode feeds down. It consists of the small, synchronous timer motor 107 driving cam 108. Power goes from the A.C. line 109, thru wire 110, switch 111, and wires 112 and 113 to one side of the motor. The circuit is completed from the other side of the motor thru wire 114 to the other A.-C. power line 115. The contactor switch 118 receives A.-C. power from line 109 thru wire 110, switch 111, wires 112 and 115A, switch 116 and wire 117. From the periodically operated switch 118, the circuit is completed thru wires 119 and 120, to down relay 121 of the motor control. Down relay 121 of FIGURE 2 corresponds to the down relay 8 of FIGURE 1. From the other side of this magnet, the circuit goes thru wire 122A, contact 123 of relay 124 and wire 125 to the other A.-C. power line 115. Consequently when switch 118 is periodically closed, the down relay 121 is energized to run the electrode motor in the down-direction. The average speed of down travel is controlled by setting the proportion of time that switch 118 is closed by cam 108.

Part 2 comprises a voltage-sensitive relay 126 which feeds the electrode downward when the voltage exceeds a preset value. The circuit goes from consumable electrode 127 thru wires 128, 129 and 130, and resistance 131 to one side of voltage-sensitive relay 126. From the other side of relay 126, the circuit is completed thru wires 130A, 132 and 131A to the metallic mold 133 in which a bath 134 is made. The arc voltage, therefore, operates relay 126, and the voltage at which this relay functions is controlled by the resistance 131. The contact 136 of relay 126 operates down relay 121. The circuit proceeds from A.-C. line 109, wire 135, contact 136, wire 137, switch 138, wires 139 and 120 to down relay 121. From the other side of relay 121, the circuit proceeds thru wire 122A, relay contact 123 and wire 125 to the other A.-C. power line 115.

Part 3 comprises a device sensitive to limited short circuits of short duration occasioned by drops of liquid metal. The important element of this device is the grid-controlled inert-gas-filled rectifier tube 140. This functions with thermal time-delay relay 4. The filament 144 of the grid-controlled tube is energized from transformer 141. The primary is connected to A.-C. lines 109 and 115 thru wires 143 and 142, respectively. The secondary of this transformer connects to filament 144 thru wires 145 and 146. The transformer supplies the power to heat the filament. Condenser 150 is connected across the arc with wires 128, 129, and 148, resistance 149 and wire 151 to one side and wires 152A, 153A and 132, mold 133 and bath 134 to the other side. One side of the condenser is connected to the grid 155 by means of wires 151 and 152, resistance 153, and wire 154. The other side of the condenser connects to the tube cathode 156 by means of wires 152A and 157, potentiometer 158 and wire 159. The potentiometer 158 is connected to battery 160 to produce a variable bias potential which controls the operation of the tube. Plate 61A of tube 140 is connected thru wire 61 to heater 62 of the thermal time delay relay 4 and then thru wire 63 to the positive terminal of a rectifier. The negative terminal of the rectifier connects to cathode 156 by wire 64. Relay 65 is connected in parallel to heater 62 of the time-delay relay 4 thru wire 66 on the one side and wires 67 and 68 on the other side.

When shorting of the electrode is not occurring, the arc voltage is about 27 volts. This will also be the voltage across condenser 150. The bias potential appearing across resistance 158 might be set to give a positive grid potential of 17 volts when there is no charge on condenser 150. When condenser 150 is charged to 27 volts, the grid voltage is the difference, or —10 volts. At this grid potential, the gas-filled tube 140 will not conduct. If shorting occurs by drops of metal, the potential between electrode 127 and melt 134 will drop to perhaps 12 volts. As the bias potential is 17 volts, grid 155 will then become 5 volts positive and tube 140 will conduct. The product of the value of resistance 149 and capacitance of condenser 150 determines the time constant of this circuit, that is, the rate of change of voltage across condenser 150 when a sudden change in arc voltage occurs. If the value of resistance 149 is low, that is, less than 1000 ohms, the circuit will respond to all short circuits by drops of metal that lower the voltage below 17 volts. If the value of resistance 49 is increased to above 10,000 ohms, then the circuit will only respond to shorts by drops of considerable duration. Consequently, varying the resistance 149 controls the sensitivity.

When tube 140 conducts electricity, relay 65 is energized, the circuit, starting at the positive side of the rectifier, comprising, in order, wires 63 and 66, relay 65, wires 67, 68, 61, tube 140 and wire 64. Energizing relay 65 closes contact 69 and opens contact 111. Contact 69 completes a circuit in parallel with tube 140, this circuit comprising, in order, wire 68, contact 69, wire 70, contact 71, bimetallic strip 72 and wire 73. The tube 140 is extinguished and relay 65 maintained in the closed position by the closing of contact 69. Current also flows thru heater 62, the circuit, starting at the positive side of the rectifier, comprising, in order, wire 63, heater 62, wire 68, contact 69, wire 70, contact 71, bimetallic strip 72, wires 73 and 64 to the negative side of rectifier. After a definite period, bimetallic strip 72 will bend, because of the heat from heater 62, opening contact 71. Relay 65 will open, unless drops of metal are still shorting the electrode, in which case relay 65 will immediately reclose and repeat the process. During the period that relay 65 is energized, contact 111 is opened and this stops the synchronous timer motor 107. Opening of contact 111 interrupts the circuit that energizes down relay 121 should motor 107 stop in such a position that contact 118 is closed. Consequently down-travel of electrode 127 is stopped for a definite time interval after a short circuit by drops of metal occurs. During this period some of the electrode will melt off, lengthening the gap. By suitable choice of timer 104 and proper settings of resistance 149 and potentiometer 158, a reasonable severity of shorting by drops of liquid metal will be maintained.

Device 5 comprises a combination of a voltage-sensitive relay and a timer, the function of which combination is to move the electrode up a definite distance if the electrode shorts the bath. Starting at the negative electrode, the circuit comprises, in order, wires 128, 129, 147, 74, variable resistance 75, wire 76, relay 77, wires 78, 154A, 132, metallic mold 133 and bath 134. The potential across the arc is therefore applied to relay 77, and the potential at which the relay releases and closes contact 79 is controlled by resistance 75. This resistance would be set so that relay 77 did not function when drops of metal shorted electrode 127 but only when a complete contact occurred. Closing of contact 79 operates timer 6, the circuit, starting at the A.-C. line, comprising, in order, wire 80, contact 79, wires 81 and 82, relay 83, wire 84, contact 85 and wire 86 to the other side of the A.-C. line. Relay 88 is also energized from wire 82, thru wire 87, relay 88, wires 89 and 86 to the A.-C. line. Energizing relay 88 closes a clutch which makes the timer operate. Energizing relay 83 closes contacts 90 and 91. Contact 90 acts as a hold contact to maintain relays 83 and 88 in the closed position. The circuit, starting at the A.-C. line, comprises, in order, wire 92, contact 90 and, in parallel as one branch, relay 83, wire 84 and contact 85, and, as the other branch of the parallel circuit, wires 82 and 87, relay 88, and wire 89, then both circuits thru wire 86 to the other side of the A.-C. line. At the end of the preset time period, contact 85 is opened by the synchronous motor, deenergizing relay 83, provided the contact 79 is open. Opening of contact 90 also deenergizes relay 88. During the period that relay 83 is energized, relay 122 is energized, running the electrode-drive motor in the up direction. Up relay 122 of FIGURE 2 corresponds to the up relay 9 of FIGURE 1. The circuit, starting at the A.-C. line, comprises, in order, wire 93, contact 91, wire 94, and relay 122 in parallel with wire 95, relay 124, and wire 96, both circuits connecting thru wire 97 to the other side of the A.-C. line. Relay 124 prevents energizing of relay 121 by opening contact 123 when relay 122 is energized.

While an arrangement for accomplishing electrode control using a constant-speed drive motor, such as an A.-C. motor, has been illustrated in the foregoing description of the invention, the principle of operation can also be applied to a proportional-type controller employing a variable-speed drive motor, such as a D.-C. motor. In the former case, short circuits by drops of liquid metal would stop the down-travel of the electrode, whereas in the latter case, they would decrease the rate of such down-travel.

The circuit of FIG. 3 consists of two major elements—part 201 comprising a standard power amplifier and part 202 comprising a device sensitive to shorting by drops of metal. The power amplifier provides an output voltage for powering the electrode-drive motor, which voltage is proportional to the algebraic sum of the input signals. A standard rotary amplifier consists of an A.-C. motor driving a D.-C. generator with several field coils. A small voltage applied to a field will produce a larger output voltage. More field coils may be used to increase the amplification or the stability. Also other forms of amplifiers can be used, such as a magnetic amplifier or gas-filled grid-controlled rectifier tubes.

Arc voltage is supplied to field coil 203 of rotary amplifier 201, the circuit, starting with consumable electrode 220 at the negative potential comprising, in order, wire 206, battery 207, wire 208, resistance 205, wire 209, coil 203, wires 210 and 211, connector 212, metal mold 213 and metal bath 214.

The current in field coil 203 is then proportional to the difference in voltage between the arc and battery 207 or other constant-voltage source. Assuming for the present no current in field coil 204, if the arc voltage exceeds appreciably the voltage of battery 207, then a current will flow thru field 203 from bottom to top and produce an output voltage across the generator commutator 15. Lines 16 and 17 connect this output with D.-C. motor 18 which turns drive 19 to shorten the arc gap. The rate of electrode travel will be essentially proportional to the difference in voltage between the arc and battery 207. Resistance 205 will control the rate of change of speed with change of voltage. If the arc voltage should be less than the voltage of battery 207, the current in coil 203 will be in the reverse direction to that previously described, that is, from top to bottom, and the output voltage and direction of rotation of the electrode motor 18, will also be reversed.

The portion of the FIG. 3 control thus far described would be satisfactory as the only means of control if the arc voltage were dependent only on the arc length. As factors other than arc length influence the arc voltage, some other means of control have to be added to make adjustments on the motor speed. This is accomplished by the device shown in part 202 of which the major portion is a grid-controlled gas-filled rectifier tube 21. The primary of transformer 22 is connected to the A.-C. power line by leads 23 and 24. The secondary of this transformer is connected to filament 25 by leads 26 and 27. Transformer 22, therefore, supplies power for heating filament 25.

For the control of part 202, the plate current of tube 21 should vary with the number and severity of short circuits occasioned by drops of liquid metal. To accomplish this, alternating current is applied to both grid 47 and plate 56 of gas-filled tube 21. Such a tube starts to conduct current when the grid becomes positive relative to the cathode voltage. The grid voltage is shifted nearly 90 degrees in phase behind the plate voltage. Consequently, if the grid has only the A.-C. voltage applied, it would conduct during the last half of the cycle, when the plate is positive. Applying a positive potential to the grid will make the grid positive sooner in the cycle and increase the current. Making the grid negative will delay the time when the grid becomes positive and decrease the current.

The grid circuit, starting with electrode 220 at the negative potential with respect to the bath, comprises wire 29, rectifier 30, wire 31, resistance 32, wire 32A, variable resistance 36, wire 37, resistance 46, wire 46A and grid 47, wire 37 being connected to parallel circuits comprising wire 37A, variable resistance 39 and wire 40 on the one hand and wire 42, condenser 38 and wire 41 on the other hand, said parallel circuits being connected to wire 43 by wires 40 and 41, respectively, the circuit from wire 43 comprising, in order, battery 44, wires 45 and 211, connector 212, mold 213, and bath 214.

The primary of transformer 33 is connected to the A.-C. line. The secondary is connected across resistance 32 thru wire 34 and reactance 35. The reactance creates a current which is out of phase in the lagging direction with respect to the transformer voltage. The drop across resistance 32 therefore also lags the transformer voltage. The voltage of transformer 33 is in phase with the voltage applied to tube plate 56, so the A.-C. voltage across resistance 32 lags the plate voltage.

The function of rectifier 30 is to permit condenser 38 to assume a D.-C. potential only when wire 29 is at a positive potential with respect to wire 43. Assuming the arc voltage is 27 volts, the voltage of battery 44 could be set at 20 volts. Consequently when electrode 20 is not being short-circuited by drops of liquid metal, wire 29 is at a negative potential with respect to wire 43, and no current will pass through rectifier 30. However, when shorts occur from electrode 20 to the bath, the voltage may momentarily drop to 15 volts, in which case wire 29 becomes 5 volts positive and potential will build up on condenser 38. The rate of build-up can be controlled by resistance 36, and the rate of decrease of charge on condenser 38 can be controlled by resistance 39. Consequently an appreciable D.-C. charge will only appear on condenser 38 following a short circuit of sufficient duration.

Condenser 38 is connected to grid 47 thru wire 42, resistance 46 and wire 46A on the one side, and thru wire 41, potentiometer 48, wire 49 and cathode 50 on the other side. Battery 51 places a potential across potentiometer 48. The potentiometer would be set so the tube draws little or no current when shorting is not occurring. Consequently when shorts occur, condenser 38 will assume a potential to make the grid more positive, and the tube current will increase.

The plate circuit of the tube is energized by transformer 52. Starting at one side of the secondary of this transformer, the circuit comprises, in order, wire 53, variable resistance 54, wire 55, plate 56, cathode 50, wire 57, field coil 204 of amplifier 201, and wire 58 to the other side of the transformer secondary. The tube current therefore flows through one of the amplifier windings, and this current is in a direction to decrease the rate of down-travel of the electrode.

Although in the above preferred embodiments of the instant invention the voltage responsive devices disclosed are relays, it will be readily apparent to those skilled in the art that other devices which are substantial equivalents for the purpose described may be substituted therefor.

Having thus described my invention and the particular manner in which I prefer to practice same, it will be obvious to those skilled in the art that various changes and modifications may be made therein without departing from the spirit and scope of my invention.

I claim:

1. Apparatus for controlling the position of an electrode to effect rapid, efficient melting thereof, said electrode having an electrical-current arc struck between said electrode and an electrical terminal positioned below said electrode in such manner that parts of said electrode become molten and fall as droplets between said electrode and said terminal and cause momentary short circuits when said electrode and said terminal are in close proximity, said apparatus comprising: drive means for lowering said electrode at a preselected rate of speed; sensing means responsive to arc voltage for determining whether or not said electrode and said terminal are in such close proximity that momentary short circuits are occurring, and control means connected to said drive means, responsive to said sensing means, and operable when said momentary short circuits are occurring to decrease, for a preselected period of time, the average rate of speed at which said drive means lowers said electrode.

2. Apparatus as defined in claim 1, characterized in that said drive means lowers said electrode continuously, and said control means operates to retard the action of the drive means for a preselected period of time.

3. Apparatus as defined in claim 1, characterized in that said drive means lowers said electrode continuously, and said control means operates to stop said drive means for a preselected period of time.

4. Apparatus as defined in claim 1, characterized in that said drive means lowers said electrode continually and intermittently and said control means operates to stop said drive means for a preselected period of time.

5. Arc melting furnace apparatus comprising a metal mold adapted to contain a molten metal bath, a consumable metal electrode extending within said mold, first means for connecting said electrode to a source of energy, second means for connecting said mold to said source for producing an arc between said electrode and said bath, drive means connected to said electrode for moving said electrode toward and away from said bath, said drive means being connected to a first relay means which, when energized, will cause said drive means to move said electrode toward said bath, said drive means being connected to a second relay means which, when energized, will cause said drive means to move said electrode away from said bath, a first timer means connected to said first relay means for periodically energizing said first relay means whereby controlled periodic electrode travel toward said bath is obtained, a second timer means, and a droplet-shorting-sensitive means connected across said arc and to said second timer means which in turn is connected to said first timer means, said droplet-shorting sensitive means energizing said second timer means when droplets of metal melting from said electrode and bridging the gap between said electrode and said bath cause momentary short circuits, said second timer means thereupon de-energizing said first timer means for a preset time period.

6. Apparatus as defined in claim 5, further characterized in that said apparatus comprises a third relay means connected across said arc for energizing said first relay means when the arc voltage exceeds a preset value whereby said electrode is moved toward said bath.

7. Apparatus as defined in claim 5, further characterized in that said apparatus comprises a complete-shorting-sensitive means connected across said arc and to a third timer means which in turn is connected to both said second relay means and a third relay means, said complete-shorting-sentitive means energizing said third timer means when substantially complete shorting of said electrode occurs, said third timer means thereupon energizing simultaneously both said second relay means and said third relay means, said second relay means thereupon causing said drive means to move said electrode away from said bath and simultaneously said third relay means de-energizing said first relay means.

8. Arc melting furnace apparatus comprising a metallic mold adapted to contain a molten metal bath, a consumable metal electrode extending within said mold, first means for connecting said electrode to a source of electrical energy, second means for connecting said mold to said source for producing an arc between said electrode and said bath, drive means connected to said electrode for moving said electrode toward and away from said bath, said drive means being connected to a first relay means which, when energized, will cause said drive means to move said electrode toward said bath, said drive means being connected to a second relay means which when energized will cause said drive means to move said electrode away from said bath, a first timer means connected to said first relay means for periodically energizing said first relay means whereby controlled periodic electrode travel toward said bath is obtained, third relay means connected across said arc for energizing said first relay means when the arc voltage exceeds a preset value whereby said electrode is moved toward said bath, a second timer means, a droplet-shorting-sensitive means connected across said arc and to said second timer means which in turn is connected to said first timer means, said droplet-shorting-sensitive means energizing said second timer means when droplets of metal melting from said electrode and bridging the gap between said electrode and said bath cause momentary short circuits, said second timer means thereupon deenergizing said first timer means for a preset time period, and complete-shorting-sensitive means connected across said arc and to third timer means which in turn is connected to both said second relay means and a fourth relay means, said complete-shorting-sensitive means energizing said third timer means when substantially complete shorting of said electrode occurs, said third timer means thereupon energizing simultaneously both said second and said fourth relay means, said second relay means thereupon causing said drive means to move said electrode away from said bath and simultaneously said fourth relay means deenergizing said first relay means.

9. Arc melting furnace apparatus of claim 8 wherein said drive means comprises a constant-speed motor.

10. Arc melting furnace apparatus of claim 9 wherein said constant-speed motor is an A.-C. motor.

11. Arc melting furnace apparatus of claim 8 wherein said first timer means comprises a cam-operated contact driven by a synchronous motor.

12. Arc melting furnace apparatus of claim 8 wherein said first timer means is preset to provide said electrode with an average speed of travel toward said bath which exceeds the rate of burn-off of said electrode.

13. Arc melting furnace apparatus of claim 8 wherein said first timer means is preset to provide said electrode with a periodic movement toward said bath of such magnitude as to cause said electrode to contact said bath.

14. Arc melting furnace apparatus of claim 8 wherein said first timer means is preset to provide said electrode with an average speed of travel toward said bath which is less than the rate of burn-off of said electrode.

15. Arc melting furnace apparatus of claim 8 wherein said droplet-shorting-sensitive means comprises a grid-controlled inert-gas-filled rectifier tube.

16. Arc melting furnace apparatus of claim 15 wherein said second timer means comprises a bimetallic strip contact operated by a resistance heater.

17. Arc melting furnace apparatus of claim 8 wherein said complete-shorting-sensitive means energizes said third timer means when droplets of metal melting from said electrode and bridging the gap between said electrode and said bath cause momentary short circuits which are repeated at sufficient frequency to lower the average arc voltage substantially.

18. Arc melting furnace apparatus of claim 8 wherein said second relay means, when energized by said third timer means, causes said drive means to move said electrode away from said bath a preset distance.

19. Arc melting furnace apparatus comprising a metallic mold adapted to contain a molten metal bath, a consumable metal electrode extending within said mold, first means for connecting said electrode to a source of electrical energy, second means for connecting said mold to said source for producing an arc between said electrode and said bath, drive means connected to said electrode for moving said electrode toward and away from said bath, power-amplifier means, means connected to said power-amplifier means and across said arc, producing a signal responsive to the decrease in arc voltage of short duration occasioned by the falling of drops of metal between said electrode and said bath, said power-amplifier means being responsive to said signal and connected to said drive means for producing an output voltage to drive said drive means.

20. Arc melting furnace apparatus of claim 19 wherein said drive means is a variable-speed motor.

21. Arc melting furnace apparatus of claim 20 wherein said variable-speed motor is a D.-C. motor.

22. Arc melting furnace apparatus of claim 19 wherein said power-amplifier means comprises a rotary amplifier consisting of an A.-C. motor driving a D.-C. generator with primary and secondary field coils.

23. Arc melting furnace apparatus of claim 22 wherein the primary field coils are connected to a constant-voltage source whereby the current caused to flow therein, hence, the rate of electrode travel toward said bath, is proportional to the difference in voltage between the arc and said constant voltage source.

24. Arc melting furnace apparatus of claim 19 wherein said power-amplifier means comprises a magnetic amplifier.

25. Arc melting furnace apparatus of claim 19 wherein said power-amplifier means comprises a gas-filled grid-controlled rectifier tube.

26. Arc melting furnace apparatus of claim 23 wherein the circuit of said primary field coils and constant-voltage source contains a variable resistance for controlling the rate of change of speed of electrode travel with change of arc voltage.

27. Arc melting furnace apparatus comprising a metallic mold adapted to contain a molten metal bath, a consumable metal electrode extending within said mold, first means for connecting said electrode to a source of electrical energy, second means for connecting said mold to said source for producing an arc between said electrode and said bath, droplet-shorting-sensitive means comprising an arc-voltage-responsive circuit, said droplet-shorting-sensitive means being responsive to a decrease in arc voltage of short duration occasioned by a drop of metal falling between said electrode and said bath and producing an electrical signal, and drive means for moving said electrode toward said bath and operative responsive to said signal to decrease the rate of travel of said electrode toward said bath for a preselected period of time.

28. An electrode control apparatus for maintaining an arc gap within a desired range in an arc furnace having a consumable electrode and having means for melting said electrode at low pressure in a substantially inert atmosphere to form a molten pool of the material comprising said electrode in said furnace, said appartus comprising power means for moving said electrode toward and away from said pool at an average speed at least equal to the difference between the melting rate of said electrode and the rate of rise of said pool and droplet-shorting-sensitive means responsive to the decrease in voltage of short duration occasioned by drops of metal falling between said electrode and said pool, said droplet-shorting-sensitive means serving to decrease the rate of travel of said electrode toward said pool for a preselected period of time.

29. An electrode control apparatus according to claim 28 wherein said power means effects a continuous movement of said electrode toward said pool.

30. An electrode control apparatus according to claim 28 wherein said power means effects movement of said electrode toward said pool in a series of small movements.

31. An electrode control apparatus according to claim 28 wherein said droplet-shorting-sensitive means serves to halt movement of said electrode for a controlled period of time.

32. An electrode control apparatus according to claim 28 wherein said droplet-shorting-sensitive means comprises a grid-controlled gas-filled tube.

References Cited in the file of this patent

UNITED STATES PATENTS

| | | |
|---|---|---|
| 1,600,348 | Mayer | Sept. 21, 1926 |
| 2,026,943 | Kennedy et al. | Jan. 7, 1936 |
| 2,717,326 | Gunton | Sept. 6, 1955 |
| 2,798,107 | Boron et al. | July 2, 1957 |
| 2,889,386 | Gruber et al. | June 2, 1959 |
| 2,915,572 | Buehl | Dec. 1, 1959 |
| 2,942,045 | Johnson | June 21, 1960 |
| 2,956,098 | Gruber et al. | Oct. 11, 1960 |

FOREIGN PATENTS

| | | |
|---|---|---|
| 264,851 | Great Britain | July 14, 1927 |
| 80,624 | Sweden | June 12, 1934 |
| 474,493 | Canada | June 12, 1951 |